United States Patent

Bamberg

[15] 3,675,130

[45] July 4, 1972

[54] A CIRCUIT ARRANGEMENT FOR EFFECTING A TUNING OF A TRANSCEIVER BY MEANS OF A MANGETIC CORE MEMORY

[72] Inventor: Paul Bamberg, Pforzheim, Germany

[73] Assignee: International Standard Electric Corporation, New York, N.Y.

[22] Filed: Sept. 18, 1970

[21] Appl. No.: 73,285

[52] U.S. Cl. ....................325/174
[51] Int. Cl. ....................H04b 1/04
[58] Field of Search ....................325/172, 174, 177, 187, 25; 333/17

[56] References Cited

UNITED STATES PATENTS 3,509,500 4/1970 McNair et al. ....................325/177
3,390,337 6/1968 Beitman, Jr. ....................325/174

*Primary Examiner*—Robert L. Griffin
*Assistant Examiner*—Barry Leibowitz
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

There is provided a remotely controlled antenna tuning device comprising a conventional magnetic core memory having the same number of rows as associated tuning steps of the transceiver and the same number of columns as antenna tuning elements (capacitors) connected by means of relays to the tuning circuit. The output signals of a first counter controlled by pulses generated while tuning the transceiver step by step, selects the corresponding row of the memory, in the columns of which is stored the information to activate the relays. The information may be stored in the memory or written in, respectively, by means of a tuning discriminator and a logic circuitry controlling a second counter and a pulse generator.

8 Claims, 1 Drawing Figure

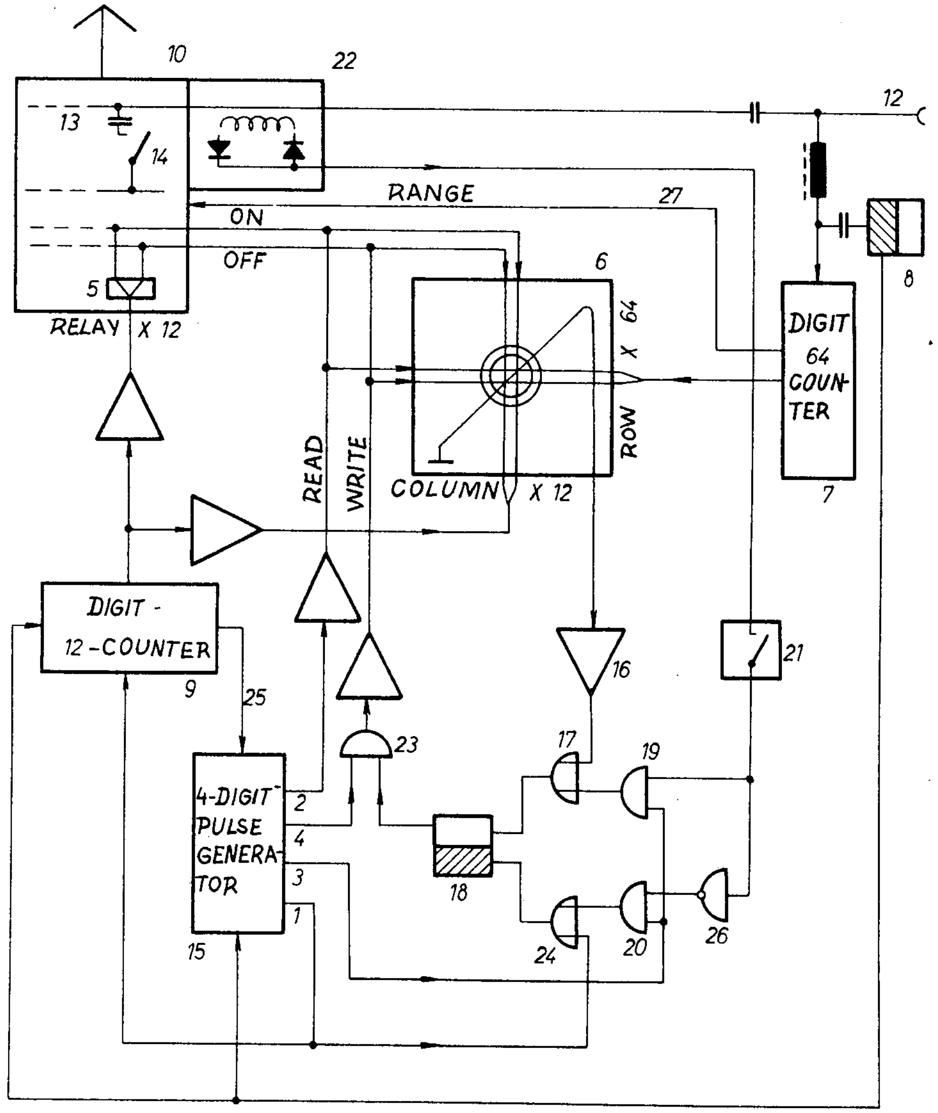
INVENTOR
PAUL BAMBERG
BY [signature]
ATTORNEY

CIRCUIT ARRANGEMENT FOR EFFECTING A TUNING OF A TRANSCEIVER BY MEANS OF A MANGETIC CORE MEMORY

The invention relates to an arrangement for effecting the automatic and radiation-free tuning of an antenna of a transceiver by means of an antenna coupler having capacitance and inductance elements which are switched on and off by relays depending on a pulse sequence which is characteristic of the frequency setting of said transceiver.

For effecting the radiation-free tuning of the antenna of a transceiver it is known from the German Petty Pat. No. 1,862,079 to provide for a preset mechanical register in which the information required for the entire frequency range is stored. This register is controlled by a servodrive depending on the frequency setting of the transceiver.

Furthermore the German Printed application No. 1,268,216 describes an arrangement for effecting the automatic tuning of a transmitter in which an antenna current indicator supervises and completes the adjustment of the resonant circuits effected by servo motors. However, this arrangement is not suitable for effecting the radiation-free tuning of an antenna because the circuits must be adjusted at maximum transmitter power.

All other arrangements, which provide for a mechanical register and/or a motor drive, are unsuitable for use in portable transceivers due to their great volume and great weight.

To this must be added the great liability to interferences and the intolerably high current consumption.

Finally, the German Printed application (DAS) No. 1,194,922 discloses a transmitter arrangement with decadic remote tuning, in which fixed capacitance elements associated with the resonant circuits are switched on and off by means of relays. In this case, the relays are energized via a control unit containing rows of push-buttons which are associated with the decades of the frequencies to be set. Such an arrangement can only be used if the device is always operated with the same antenna and, if possible, at the same place. In addition, the great number of control lines makes impossible the use of a separate antenna coupler with portable transceivers.

It is the object of the invention to provide a circuit arrangement for effecting the radiation-free tuning of the antenna of a transceiver, which arrangement contains no movable mechanical parts, has a small volume, low weight and low current consumption, and requires few control lines.

The invention is characterized in that a ring core memory is provided for, which has a row for each frequency information of the transceiver and a column for each relay serving to connect the capacitance elements, that a counter is provided for selecting said rows, which also effects the control of said relays for the switch-over of the inductance elements, and that a logic circuit having a counter and a pulse generator serves, when introducing the necessary positions of said relays, to determine the conditions of the respective cores of said ring core memory depending on the output criteria of a tuning discriminator associated with the antenna coupler, and, during the radiation-free tuning, to set said relays depending on the stored conditions of the ring cores of, in each case, one row.

Such a circuit arrangement permits an easy and rapid storage of the tuning information, essentially requires only the already present antenna cable as control line and permits, if necessary, the correction of the stored information during operation.

BRIEF DESCRIPTION OF THE DRAWINGS

The foregoing objects and features and the following description of the invention will best be understood if reference is made to the sole FIGURE which illustrates the circuit arrangement utilizing a magnetic core memory according to the invention.

In this embodiment, the reference character 10 designates the separate antenna coupler of a transceiver, which antenna coupler is connected with the antenna connection of the transceiver via the connection 12. For tuning the antenna coupler, e.g. 12 capacitance elements 13 are provided for, which are, for each step of the frequency setting of the transceiver, switched on or off through contacts 14 of the relays 5.

The relays 5 are designed as polarized latching relays which require only a short current pulse for their operation.

For storing the information for the tuning of the antenna coupler 10, a ring core memory 6 is used in which a row (altogether 64) is provided for each frequency step of the transceiver and a column for each of the 12 relays 5 of the antenna coupler 10.

The relays 5 are normally in the position determined by the last frequency setting. Then, in the respective column of the ring core memory 6, the cores belonging to the relays 5 being in the "off"-position are in the magnetic condition "1," and the cores for the other relays are in the condition "0." It is also assumed that the cores contained in the remaining 63 rows, too, are set in accordance with the respective frequency steps.

It is assumed that the transceiver is such that 64 frequency steps are required for effecting the coarse tuning of a frequency range. An embodiment of an oscillator for such an equipment is described, for example, in the British Pat. No. 1,109,559. During the signal-seeking operation caused by a new frequency setting, this arrangement supplies a number of pulses to the connection 12 which is equivalent to the number of the effected frequency steps.

This pulse sequence is applied to the counter 7, which selects the respective line of the ring core memory 6, and to the monostable multivibrator 8 which, after further pulses have failed to appear, returns the ring counter 9 to its initial position and starts the pulse generator 15.

Via means not shown, the pulse generator 15 sets all relays 5 to the "off"-position. However, the cores of the ring core memory 6 remain in the impressed position.

The first pulse(output 1) of the pulse generator 15 switches the ring counter 9 by one step and thus prepares the circuit for the first of the relays 5 for the subsequent operation.

The second pulse (output 2) sets the first relay to the "on"-position and sends a read current through the ring core memory 6 which sets the respective core to the condition "0." If this core was in the position "1," its magnetic reversal produces a pulse which, via the amplifier 16 and the OR-circuit 17, sets the bistable multivibrator 18 to the other position (temporary storage).

Via the AND-circuits 19 and 20 the third pulse (output 3) interrogates the condition and the output of the switching stage 21 which disconnects the tuning indicator during normal operation. Thus, the condition "0" prevails at the output and the following stages remain uninfluenced.

The fourth pulse (output 4) of the counter 15 is applied to the AND-circuit 23. If the multivibrator 18 supplies no signal, the pulse cannot pass the AND-circuit 23, whereby the relay remains in the "on"-position and the respective ring core in the condition "0." If, however, the multivibrator 18 had changed its state, the pulse at the output 4 sets the relay to the "off"-position and simultaneously sets the respective ring core to the condition "1."

The subsequent pulse at the output 1 of the counter 15 then advances the counter 9 one step. The multivibrator 18 is returned to its initial state via the AND-circuit 25 and the above-described operations are repeated for the second of the relays 5 and the respective core on the ring core memory 6. When all 12 cores of the row have been interrogated, a pulse at the row 25 stops the operation of the counter 15.

If, for effecting the tuning of the antenna coupler, there is required an expansion of the frequency range by switching over inductance elements, the necessary trigger pulses can be derived from the counter 7. In the basic circuit diagram, such a trigger pulse of the counter 7 is applied to the antenna coupler 10 over a line 27 where it causes a change of inductance via a relay not shown.

If the information for effecting the tuning of the antenna is to be stored anew in the ring core memory 6, the switching